Patented Oct. 15, 1940

2,217,683

UNITED STATES PATENT OFFICE 2,217,683

NITROGENOUS COMPOUNDS

Morris Katzman, Chicago, Ill., assignor to The Emulsol Corporation, Chicago, Ill., a corporation of Illinois No Drawing. Application August 7, 1939, Serial No. 288,777

17 Claims. (Cl. 260—295)

This invention relates to new chemical compounds of the quaternary ammonium type which are characterized by possessing interface modifying properties rendering the same highly useful for the purposes for which such agents are employed in the various arts.

At least most of the novel compounds fall within the scope of the general formulae $$RO-(alk-NY)_m-CO-Z \begin{matrix} CO-T \\ | \\ -(Q)_w \end{matrix} \text{ and}$$

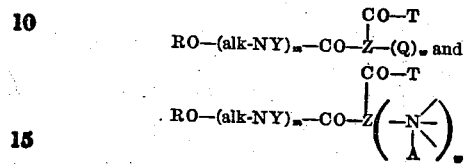

wherein R is an organic radical containing at least four carbon atoms, alk stands for hydrocarbon, for example, alkylene or arylene such as ethylene or phenylene, Y is hydrogen, alkyl, cycloalkyl, alkoxyl, aralkyl, aryl, or alkylol, Z is a residue, generally a carbon-hydrogen residue of a polycarboxylic acid, preferably aliphatic and preferably containing not more than eight carbon atoms, A is an anion, preferably of a solubilizing character, T is (1) a member of the group NHR' where R' is hydrogen, lower alkyl, hydroxyalkyl, and cycloalkyl, or (2) OY' where Y' is a cation, lower alkyl, cycloalkyl and an aliphatic polyhydric alcohol radical, $m$ and $w$ are whole numbers, $w$ being preferably 1 or 2, Q is a quaternary ammonium radical, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member. By the term "quaternary ammonium radical" I mean one containing a pentavalent nitrogen wherein four valences are satisfied by carbon and the fifth valence by an anion.

A more limited aspect of the compounds of the invention may be represented by the general formula

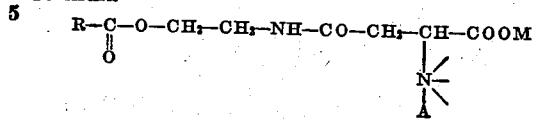

wherein R is a hydrocarbon radical or substituted hydrocarbon radical containing at least seven and preferably from eleven to seventeen carbon atoms, and M is a cation.

The radical R in the above formulae may be of aliphatic, cycloaliphatic, aromatic or aromatic-aliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain upwards of ten carbon atoms to about eighteen carbon atoms. Z and alk likewise may contain substituent groups such as those just mentioned and the sequence of carbon atoms therein may be interrupted by O, S, C=O, NH, NR where R is alkyl, and the like.

In order that the nature of the invention may become apparent, there are listed hereinbelow representative compounds which fall within the scope of the invention:

(1) 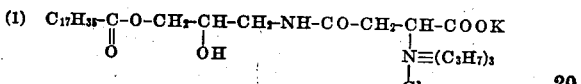

(2) 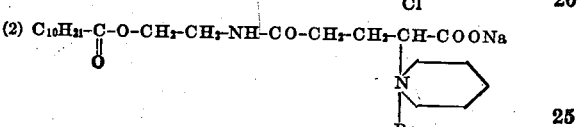

(3) 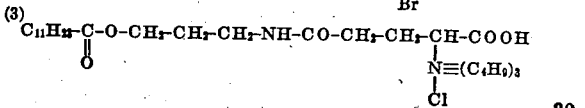

(4) 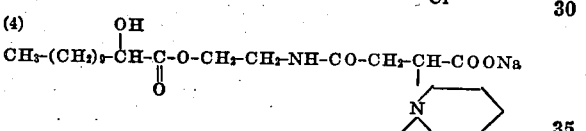

(5) 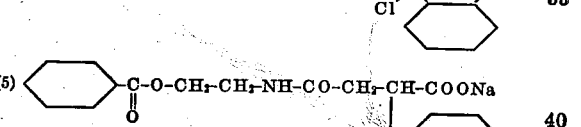

(6) 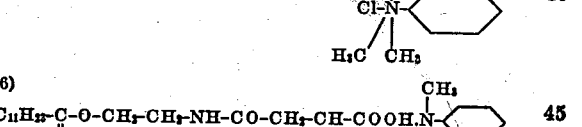

(7) 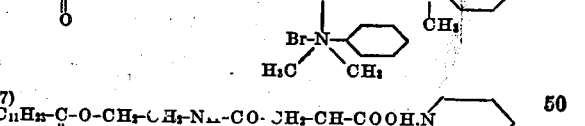

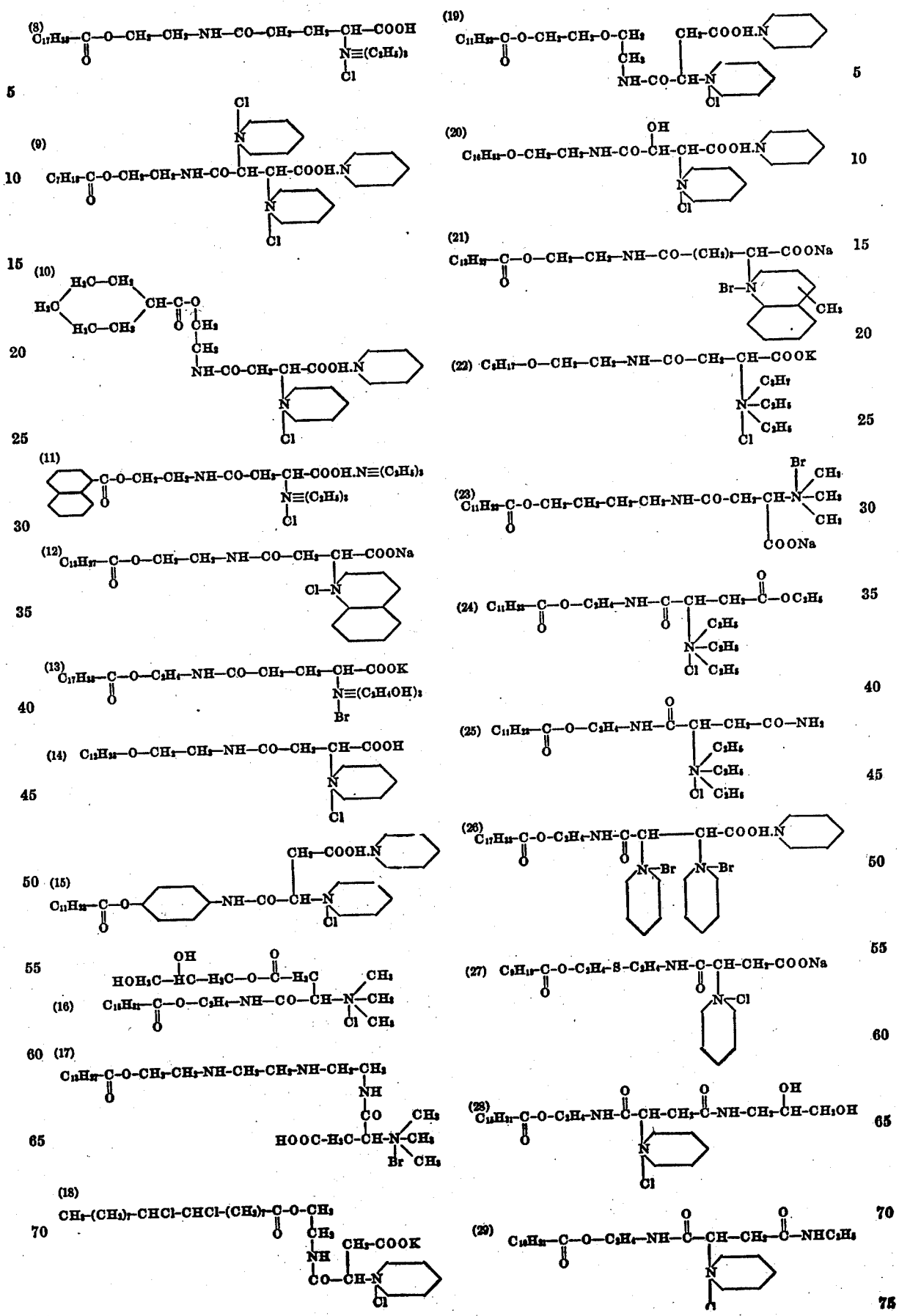

(30)

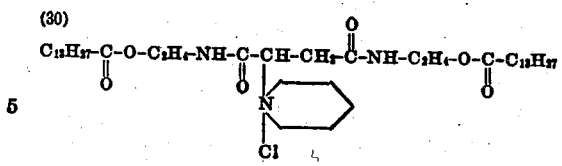

While the above examples represent single substances, it will be understood that in practice it is, in general, more advantageous to employ mixtures of any two or more thereof with or without diluents. It should be understood that while the compounds of the invention have been described hereinabove through the medium of chemical formulae, in many cases the final products are mixtures of different substances which are best and most accurately described in the form of reaction products of stated materials.

In general, the compounds may be prepared by initially reacting a primary or secondary alcohol amine or alkylol amine, including corresponding polyamines, for example, monoethanolamine, with a halogen-polycarboxylic acid halide or other derivative under conditions such as to insure a substantial yield of amide. It has been found that if the halogen-polycarboxylic acid is employed in the form of an ester, for example, ethyl chlor-succinate, and low temperatures are employed, of the order of about 0 degrees C. to about 10 degrees C., excellent yields of amide are obtained. The resulting amide is then reacted with a higher molecular weight organic acid or halide thereof to produce the ester and with an organic nitrogenous base such as pyridine to produce a pentavalent nitrogen.

An alternative method comprises utilizing an unsaturated polycarboxylic acid or anhydride or other derivative such as maleic acid, maleic anhydride, fumaric acid, ethyl maleate or the like in place of the halogeno polycarboxylic acid halide. In this event, the resulting unsaturated polycarboxylic acid amide derivative may be treated with halogen, halogen acid such as hydrochloric acid, hydrobromic acid, hypochlorous acid, or hypobromous acid, whereby halogen is introduced into the molecule at a double bond of the polycarboxylic acid radical. The resulting compound may then be treated with an organic nitrogenous base such as pyridine, quinaldine, tripropyl amine, or the like. The higher molecular weight organic acid radical which is ester-linked to the primary or secondary alcohol amine radical may be introduced into the molecule by means of an acyl halide either prior or subsequent to the treatment with the organic nitrogenous base.

The following examples are illustrative of methods which have been found suitable for preparing various of the compounds which are disclosed herein. It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

(1) 10 grams of maleic anhydride were added slowly, with stirring, to a solution of 6.2 grams of monoethanolamine and 25 cc. of dry dioxane. The reaction mixture, after a period of about 10 minutes, was cooled to 25 degrees C. on a cold water bath.

(2) To the reaction product of part (1) hereof, 22 grams of lauroyl chloride were added dropwise, with stirring, over a period of about ½ hour, the reaction mixture being maintained at about 30 degrees C. in a cold water bath.

(3) To the reaction mass produced in part (2) hereof, chlorine gas was slowly bubbled therethrough for a period of about 4 hours or until a total of about 7 grams of chlorine was absorbed. 30 grams of triethyl amine were then added slowly and with stirring, the reaction mass being kept at a temperature of 30 degrees C. to 40 degrees C. in a cold water bath. The mass was then allowed to stand for approximately two days. The reaction mass, which had foaming and wetting properties, contained a substantial proportion of a compound having the following probable formula:

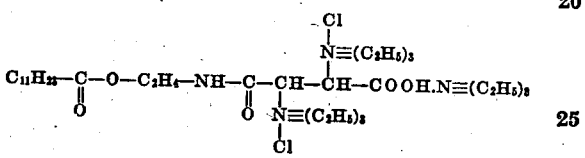

*Example B*

(1) 12.4 grams of monoethanolamine were dissolved in 50 cc. of water and there were added thereto, dropwise and with stirring and cooling in an ice bath, 40 grams of di-brom succinyl bromide. During the addition of the di-brom succinyl bromide, 8 grams of sodium hydroxide, previously dissolved in 50 cc. of water, were gradually added. The additions of the di-brom succinyl bromide and the solution of the sodium hydroxide took place over a period of about ½ hour.

(2) To the reaction mass of part (1) hereof, 42 grams of lauroyl chloride were slowly added, and simultaneously therewith a solution of 8 grams of sodium hydroxide and 50 cc. of water was slowly added, the reaction mass being maintained in an ice bath during the addition. The oily reaction product was taken up with 100 cc. of ethyl ether and anhydrous sodium sulphate was mixed therewith in order to dry the product.

The salts were then filtered off and the ether evaporated, the resulting residue being a reddish oil.

(3) To the reaction product of part (2) hereof, maintained at about 25 degrees C., 25 cc. of pyridine were added and the mass was allowed to stand for a period of about 24 hours. The reaction product, which had foaming and wetting properties, contained a substantial proportion of the compound having the following probable formula:

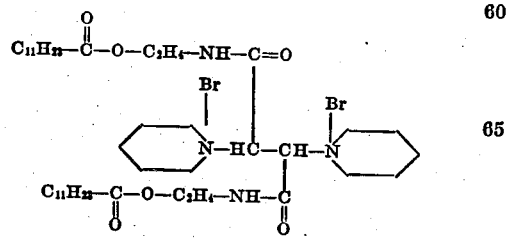

*Example C*

(1) To 71 grams of maleic anhydride, 100 cc. of dry chloroform and 113.5 grams of bromine were added and the mixture exposed to sunlight for a period of 5 to 6 hours. From the resulting solution, which was amber colored, the chloroform was evaporated in vacuo at a temperature from 50 degrees C. to 60 degrees C. The residue comprised largely di-brom succinic anhydride.

(2) 3.1 grams of monoethanolamine were dissolved in 50 cc. of water and there were added thereto, slowly and with stirring, 13 grams of di-brom succinic anhydride, as produced in part (1) hereof. The addition of the di-brom succinic anhydride took place over a period of about 10 minutes, the reaction mass being maintained at a temperature of 25 degrees C. to 30 degrees C. in a cold water bath.

(3) The reaction mass of part (2) hereof was evaporated to dryness and there were added thereto, while maintaining the product at about 25 degrees C., 20 cc. of pyridine and there were then added, dropwise, and with stirring, 10 grams of lauroyl chloride. The reaction mass was allowed to stand for 24 hours. It had foaming and wetting properties and contained a substantial proportion of a compound having the following probable formula:

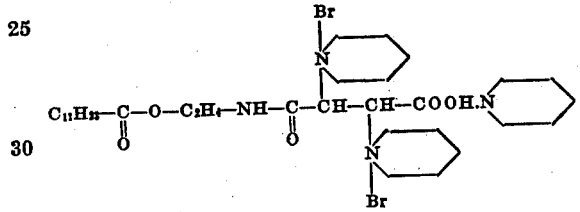

*Example D*

(1) 5.3 grams of diethanolamine were dissolved in 50 cc. of water and there were added thereto, slowly and with stirring, 13 grams of di-brom succinic anhydride, the reaction mass being maintained at a temperature of about 30 degrees C. for about 10 minutes.

(2) The reaction mass of part (1) hereof was heated, in vacuo, to evaporate the water and the liquid residue was then cooled to 25 degrees C. and there were added thereto, slowly and with stirring, 30 cc. of pyridine, the reaction mass being kept at a temperature of about 25 degrees C. 16.2 grams of octoyl chloride were then added dropwise to the reaction mass and the same was then allowed to stand for a period of about 24 hours. 100 cc. of approximately 0.5 N alcoholic KOH were then added. The resulting reaction product was then washed twice, each time with 200 cc. portions of petroleum ether to eliminate the excess pyridine which was soluble therein. After each washing, the petroleum ether was decanted and the petroleum ether adhering to the residue was driven off at slightly elevated temperatures. The final product, which had foaming and wetting properties, contained a substantial proportion of a compound having the following probable formula:

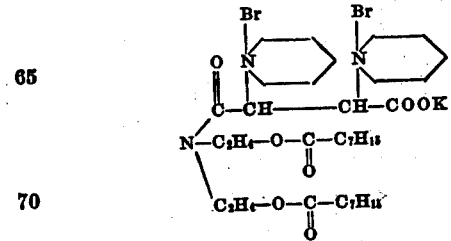

*Example E*

(1) 6.0 grams of monoethanolamine were dissolved in 50 cc. of water and there were added thereto, slowly and with stirring, 18 grams of mono-brom succinic anhydride. During the addition of the mono-brom succinic anhydride, which took place over a period of about 10 minutes, the reaction mass was maintained at a temperature between 25 degrees C. and 30 degrees C. by means of a cold water bath.

(2) The reaction product of part (1) hereof was heated in vacuo to evaporate the water and, to the oily residue, 18 cc. of pyridine were added, the mass being maintained at about 25 degrees C. There were then added, dropwise and with stirring and cooling to about 30 degrees C., 30 grams of stearoyl chloride. The reaction mass was then allowed to stand for about 24 hours and was washed twice, each time with 200 cc. portions of petroleum ether, the remaining procedure being the same as described hereinabove in Example D. The final product, which had foaming and wetting properties, contained a substantial proportion of a compound having the following probable formula:

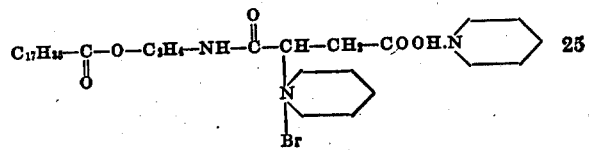

It will be understood, particularly in the light of the examples hereinabove, that the novel compounds of the present invention may contain one or more imino or like linkages. Thus, for example, in place of employing monoethanolamine or monopropanolamine or the like as a starting material, compounds may be utilized having a plurality of imino groups such as the following, by way of illustration:

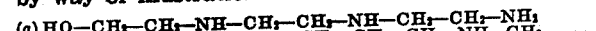
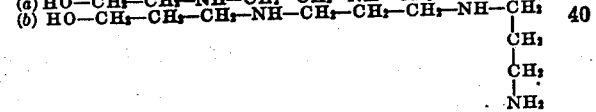

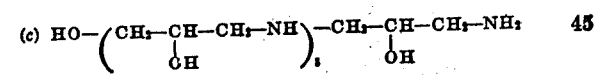

As Examples 14, 21 and 23 show, the compounds may also comprise higher molecular weight ether derivatives. The higher molecular weight ethers may be prepared, for example, by reacting a compound containing a reactive halogen, for example.

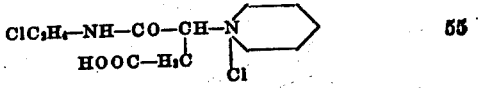

with an alkali metal alcoholate such as sodium laurylate ($C_{12}H_{25}$—ONa) in accordance with general methods known in the art. In general, the higher molecular weight esters are more satisfactory for most purposes.

In certain instances, as indicated, by way of illustration, in Examples 3, 8, 14 and 17, a free carboxyl group may be present in the compounds. Such compounds may be further reacted to esterify or amidify the free carboxyl group to convert the same into the groups —$CONH_2$, —CONHR, and COOR where R is preferably lower molecular weight alkyl or cycloalkyl such as ethyl, butyl, cyclohexyl, and the like, which may contain substituent groups such as halogeno, hydroxy, amino, cyanogen and the like. In the case of the ester linkage, that is, the —COOR group, the radical R may be that of a polyhydric alcohol or polyhydroxy substance such as glycerol, glycols, and polyglycols such as ethylene glycol, propylene glycol, butylene glycol, di-ethylene glycol, polyglycerols, and the like. Such derivatives have particularly desirable properties in the technical and industrial arts. The usual amidification and esterification procedures can readily be adapted by the skilled chemist to the preparation of such derivatives.

The higher molecular weight organic radical represented by R in the general formulae may, as stated, be derived from various sources. Among such sources may be mentioned straight chain and branched chain higher molecular weight carboxylic, aliphatic, and fatty acids, saturated and unsaturated, such as caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

In those cases where ethers are prepared, the higher molecular weight organic radical is derived from alcoholates of alcohols corresponding to the higher molecular weight acids referred to hereinabove.

It has previously been indicated that the anion represented by the letter A in the general formula illustrating most of the novel agents of the present invention is preferably a solubilizing anion such as chlorine, bromine or iodine. Other anions may be substituted therefor as, for example, $OH^-$, $HSO_4^-$, $RSO_4^-$, $C_6H_5SO_3^-$, $NO_3^-$, acetate, propionate, caproate, laurate, oleate, stearate, borate, phosphate, or some other organic or inorganic anion. As a general rule the halogen derivatives are particularly satisfactory.

The unsaturated polycarboxylic acids, their anhydrides and esters, and the halogeno-polycarboxylic acids or other derivatives thereof, in the form of their esters with ethyl alcohol or the like, which are reacted with the primary or secondary alcohol amines or the higher esters or ethers of said alcohol amines may be selected from a relatively large class including aliphatic and aromatic compounds such as, for example, maleic acid, maleic anhydride, ethyl maleate, fumaric acid, mono-chlor succinyl chloride, di-chlor succinyl chloride, mono-chlor succinic acid, di-chlor succinic acid, ethyl chlor-succinate, di-chlor glutaryl chloride, and the corresponding derivatives of malonic acid, citraconic acid, mesaconic acid, itaconic acid, mucic acid, adipic acid, pimelic acid, sebacic acid, suberic acid, azelaic acid, aconitic acid, phthalic acid, and the like. Of particular utility are maleic acid, fumaric acid, ethyl maleate, and maleic anhydride.

The primary and secondary alcohol amines or alkylolamines which are reacted with the chlor succinyl chloride or the like to produce the halogen-containing amides include, among others, by way of example, monoethanolamine, diethanolamine, monopropanolamine, dipropanolamine, monobutanolamine,

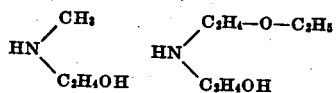

monocyclohexyl, beta-hydroxyethyl amine; monobutyl, beta-hydroxyethyl amine; phenyl ethanolamine; 1-amino-propanediol-2,3; mono- and di-pentanolamines, hexanolamines, decylolamines and the like; glycerolamines, sugar and sugar alcohol amines such as sorbitol monoamine, and the like.

The nitrogen present in the novel substances of the present invention, such as is present in quaternary ammonium radicals or the like, may be introduced into the molecule by means of various organic nitrogenous bases as, for example, alcohol amines and alkylol-, arylol- and aralkylol amines including mono-, di- and tri- ethanolamine and mixtures thereof such as are, for example, present in so-called commercial triethanolamine, propanolamines, butanolamines, pentanolamines, hexanolamine, glycerolamines, dibutyl ethanolamine, diethanol ethyl amine, cyclohexyl ethanolamine, diethanol cyclohexylamine, ethanol aniline; alkylol polyamines such as alkylol derivatives of ethylene diamine, monomethyl monoethanolamine, diethyl-mono-ethanolamine; alkylamines such as tributyl amine, trihexylamine, trimethylamine, aromatic and heterocyclic bases such as cyclo-hexylethyl-aniline, pyridine, alkyl pyridines such as methyl-pyridine, piperidine, pyrrolidines, quinoline, quinaldine, nicotine, and homologues and derivatives or substitution products thereof; mixtures of any two or more thereof, and the like. It will be understood that these organic bases, as in the case of triethanolamine, for example, may be employed in pure, impure, or commercial form. Where quaternary ammonium compounds are produced, it will be understood that tertiary organic nitrogenous bases are utilized.

The compounds of this invention have utility in various arts in which interface modifying agents are employed. They are resistant to precipitation by calcium and magnesium salts and are compatible with acid and alkali media. They may be utilized in washing and laundering and the textile and related industries wherein they function for softening, wetting, detergent, emulsifying, penetrating, dispersing, frothing and foaming purposes. The textiles, various treatments of which in the presence of the agents of the present invention are rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. Another use to which the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes, particularly for the separation of silica from ores containing the same. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oil-field operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, mono- butyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates, as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulpho-carboxylic acid esters of higher molecular weight alcohols such as lauryl sodium sulpho-acetate, dioctyl sodium sulpho-succinate, dilauryl potassium sulpho-glutarate, lauryl monoethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey-red oils; compounds of the type of isopropyl naphthalene sodium sulphonate, and other classes of wetting agents.

Wherever the term "higher" is employed as referring to higher molecular weight organic acids or the like, it will be understood to cover compounds or radicals having at least six carbon atoms unless otherwise specifically stated.

What I claim as new and desire to protect by Letters Patent of the United States is:

1. Chemical compounds corresponding to the general formula

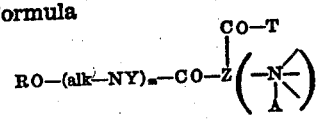

wherein R is an organic radical containing at least four carbon atoms, alk is a hydrocarbon residue with or without interruptions or substitutions, Y is a member selected from the group consisting of hydrogen, alkyl, cycloalkyl, alkylol, alkoxyl, aralkyl, and aryl, Z is the residue of a polycarboxylic acid, A is an anion, T is (1) a member of the group NHR' where R' is hydrogen, lower alkyl, hydroxy-alkyl, cycloalkyl, or (2) OY' where Y' is a cation, lower alkyl, cycloalkyl or an aliphatic polyhydric alcohol radical, $m$ and $w$ are small whole numbers, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

2. Quaternary ammonium chemical compounds corresponding to the general formula

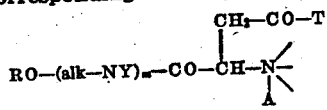

wherein R is an aliphatic radical containing from eight to eighteen carbon atoms, alk is a hydrocarbon residue with or without interruptions or substitutions, Y is a member selected from the group consisting of hydrogen, alkyl, cycloalkyl, alkoxyl, aralkyl, aryl, and alkylol, A is halogen, T is (1) a member of the group NHR' where R' is hydrogen, lower alkyl, hydroxy-alkyl, cycloalkyl, or (2) OY' where Y' is a cation, lower alkyl, cycloalkyl or an aliphatic polyhydric alcohol radical, $m$ is a small whole number, and the three indicated valence bonds attached to nitrogen are satisfied by radicals of the class consisting of alkyls, cycloalkyls, alkylols, aralkyls, aryls, aralkylols, and the radical of heterocyclic ring of which the nitrogen is a member.

3. Quaternary ammonium chemical compounds corresponding to the general formula

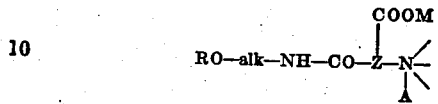

wherein R is an organic radical containing at least four carbon atoms, alk is alkylene, Y is a member selected from the group consisting of hydrogen, alkyl, cycloalkyl, alkoxyl, aralkyl, aryl, and alkylol, Z is the residue of a polycarboxylic acid, A is an anion, M is a cation, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

4. Chemical compounds corresponding to the general formula

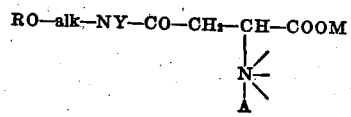

wherein R is an aliphatic radical containing from eight to eighteen carbon atoms, alk is alkylene, Y is a member selected from the group consisting of hydrogen, alkyl, cycloalkyl, alkoxyl, aralkyl, aryl, and alkylol, A is a halogen, M is a cation, and at least one of the three indicated valence bonds attached to nitrogen is satisfied by a radical of the class consisting of alkyls, cycloalkyls, alkylols, aralkyls, aryls, aralkylols, and the radical of a heterocyclic ring of which the nitrogen is a member.

5. Chemical compounds corresponding to the general formula

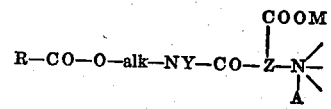

wherein R—CO is an acyl radical containing at least eight carbon atoms, alk is alkylene, Y is a member selected from the group consisting of hydrogen, alkyl, cycloalkyl, alkoxyl, aralkyl, aryl, and alkylol, Z is the residue of an aliphatic dicarboxylic acid, A is an anion, M is a cation, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

6. Chemical compounds corresponding to the general formula

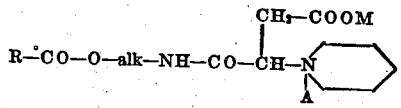

wherein R—CO is an acyl radical containing at least eight carbon atoms, alk is alkylene, A is halogen, and M is a cation.

7. Quaternary ammonium chemical compounds corresponding to the general formula

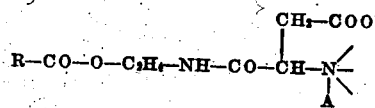

wherein R—CO is an acyl radical containing from eight to eighteen carbon atoms, A is halogen, M is a cation, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member.

8. A chemical compound having the formula

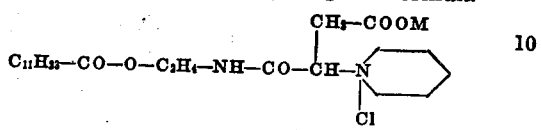

where M is a cation.

9. Chemical compounds in accordance with the formula

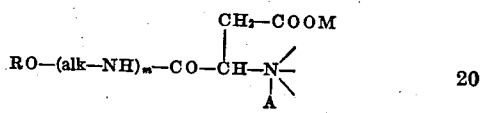

wherein R is a radical selected from the group consisting of alkyl and acyl radicals containing from eight to eighteen carbon atoms, alk is alkylene, m is a whole number, A is halogen, and M is a cation.

10. Chemical compounds in accordance with the formula

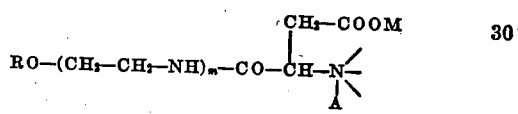

wherein R is a radical selected from the group consisting of acyl and alkyl radicals containing at least eight carbon atoms, m is a whole number, A is an anion, and M is a cation.

11. Chemical compounds in accordance with the formula

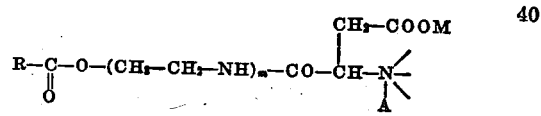

wherein R—C=O is a fatty acid acyl radical containing from eight to eighteen carbon atoms, m is a whole number, A is halogen, and M is a cation.

12. The process of producing chemical compounds having the general formula

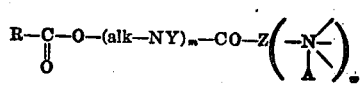

wherein R—C=O is an acyl radical containing at least four carbon atoms, alk stands for alkylene, Y is a member selected from the group consisting of hydrogen, alkyl, cycloalkyl, alkoxyl, aralkyl, aryl, and alkylol, A is an anion, Z is the residue of a polycarboxylic acid, m and w are whole numbers, and the three indicated valence bonds attached to nitrogen are satisfied by radicals of the class consisting of alkyls, cycloalkyls, alkylols, aralkyls, aryl, aralkylols and the radical of a heterocyclic ring of which the nitrogen is a member, which comprises the steps of reacting a member selected from the group consisting of organic acids and halides thereof containing at least four carbon atoms, a tertiary organic nitrogeneous base, and a compound of the general formula HO—(alk—NY)$_m$—CO(—Z—halogen)$_w$ wherein alk, Y, m, w, and Z have the foregoing significance.

13. The process of claim 12 wherein the organic acid is a fatty acid having from eight to eighteen carbon atoms, and the tertiary organic nitrogenous base is pyridine.

14. The process of producing chemical compounds having the general formula

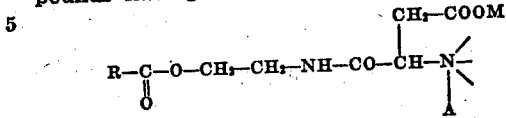

wherein R—C=O is an acyl radical having from eight to eighteen carbon atoms, A is an anion, M is a cation, and the three indicated valence bonds attached to nitrogen are satisfied by radicals of the class consisting of alkyls, cycloalkyls, alkylols, aralkyls, aryls, aralkylols, and the radical of a heterocyclic ring of which the nitrogen is a member, which comprises the steps of reacting a halide of an organic acid having from eight to eighteen carbon atoms, a tertiary organic nitrogeneous base, and a compound of the general formula

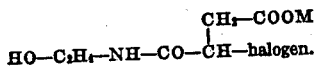

15. Chemical compounds containing the nucleus

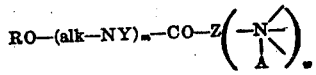

wherein R is an organic radical containing at least four carbon atoms, alk is a hydrocarbon residue with or without interruptions or substitutions, Y is a member selected from the group consisting of hydrogen, alkyl, cycloalkyl, alkoxyl, aralkyl, aryl and alkylol, Z is the residue of a polycarboxylic acid, A is an anion, and $m$ and $w$ are small whole numbers.

16. Chemical compounds corresponding to the general formula

wherein R—CO is an acyl radical containing at least four carbon atoms, alk is alkylene, Y is a member selected from the group consisting of hydrogen, alkyl, cycloalkyl, alkoxyl, aralkyl, aryl, and alkylol, Z is the residue of an aliphatic dicarboxylic acid, $m$ is a whole number, and Q is a quaternary ammonium radical.

17. Chemical compounds corresponding to the general formula

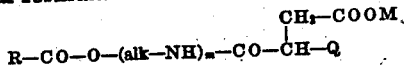

wherein R—CO is an aliphatic acyl radical containing at least eight carbon atoms, alk is alkylene, $m$ is a whole number, M is a cation, and Q is a quaternary ammonium radical.

MORRIS KATZMAN.